Sept. 27, 1966    J. H. MYER    3,275,273
SUPPORT STRUCTURE FOR LASER RODS
Filed Nov. 1, 1965

INVENTOR.
JON H. MYER
BY J. K. Haskell

3,275,273
SUPPORT STRUCTURE FOR LASER RODS
Jon H. Myer, Newport Beach, Calif., assignor to Hughes Aircraft Company, Culver City, Calif., a corporation of Delaware
Filed Nov. 1, 1965, Ser. No. 505,848
6 Claims. (Cl. 248—264)

This invention relates to laser devices, and more particularly to improved means for supporting the end portions of a laser rod.

In a typical ruby laser, for example, the ruby rod extends through a pumping light source, such as a helical flashlamp, and a reflector surrounds the light source. These elements are supported in a light-tight housing, with the terminals of the lamp extending to the exterior of the housing. The laser rod is clamped at its ends between support elements, one of which extends to the exterior of the housing, and is located at the end of the rod through which the laser beam emerges.

For cooling purposes, a suitable fluid is circulated through the space between the rod and the reflector. Accordingly, it is essential that there be no leakage of fluid either along the outer surfaces of the support elements, or between the contacting portions of the rod and the support elements. Sealing elements, e.g., O-rings, may be used as fluid seals between the support elements and the housing. In this connection, the O-rings are located at points substantially removed from the ends of the rod, and are thus removed from the vicinity where high temperatures or high actinic light levels occur which could cause their deterioration.

However, high temperatures and light levels do occur at the ends of the laser rod, and such additional sealing means cannot be used to prevent leakage of fluid between the contacting portions of the rod and the support elements. Rather, sealing must be effected by the support elements alone. To effect such sealing, it has been found necessary to bring the support element to bear against the extreme ends of the rod with considerable force. Unfortunately, as has been too often experienced, these forces are sufficient in many instances to fracture the end faces of the rods at their peripheries. The result, of course, destroys the desired functioning of the laser, and necessitates regrinding or discharding the expensive rod.

It is an object of my invention to provide support elements for a laser rod which overcomes the above and other disadvantages of the prior art.

It is another object of my invention to provide support elements for the ends of a laser rod which firmly grip the end of the rod mechanically and form a hermetic seal to prevent leakage of fluid therebetween, and which cannot be applied to fracture the rod.

It is a further object of my invention to provide an improved holder for a laser rod which is of simple design and rugged construction.

The above and other objects and advantages of my invention will become apparent from the following description taken in conjunction with the accompanying drawing of an illustrative embodiment thereof, in which.

Figure 1:
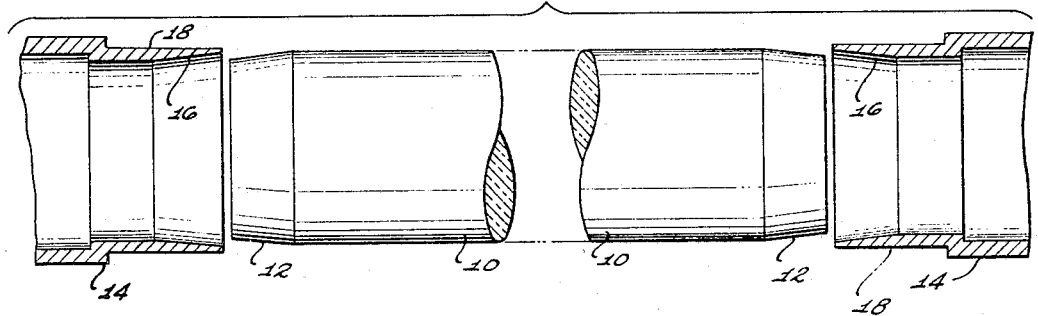
FIGURE 1 is a fragmentary sectional view of the end portions of a laser rod and support elements therefor, showing the support elements in position preparatory to positioning them on the ends of the rod.
Figure 2:
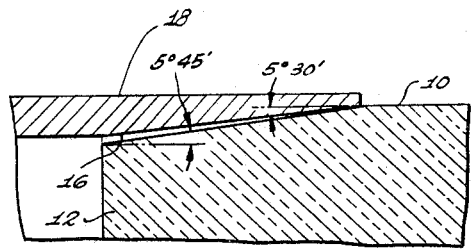
FIGURE 2 is an enlarged, fragmentary sectional view of a heated support element as it is initially placed on one end of a laser rod, showing the different tapers of confronting surfaces of the rod and support element.

Referring to FIGURE 1, a laser rod 10 is shown with tapered or frusto-conical ends 12. The degree of taper is extremely slight, preferably being less than 6°. As shown in FIGURE 2, the rod 10 in one construction is formed with its ends 12 tapered at an angle of 5°45'. The rod 10 in FIGURE 1 is shown between metal tubular support elements 14 having end openings which define tapered or frusto-conical interior surfaces 16.

The elements 14 are heated preparatory to positioning them on the ends 12 of the rod. When so heated and positioned, the tapered surface 16 in the end of each tubular element 14 is dimensioned so that the diameter of the outer or large end of the tapered surface 16 is the same as that of the body of the rod 10. Additionally, the taper of the surface 16 is slightly less than that of the rod 10, e.g., 5°30'. Thus, when the element 14 is heated and placed on the rod 10, the outer end of the tapered surface 16 engages the rod at the large diameter end of the tapered end 12.

Figure 3:
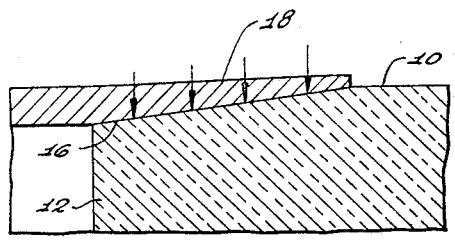
FIGURE 3 is an enlarged, fragmentary sectional view similar to FIGURE 2, showing the support element following cooling and contraction thereof to form surface to surface mechanical and fluid sealing contact throughout the length of the surface of the rod engaged by the support element.
Figure 4:
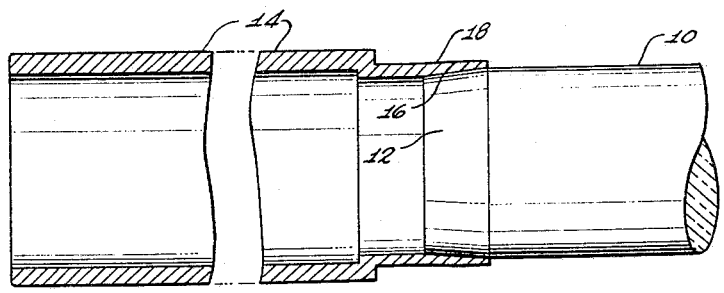
FIGURE 4 is a longitudinal sectional view of one of my support elements after it has been secured to the rod.

In these positions of the parts, there is only the circular line of contact between them. However, since the support element 14 contracts as it cools, the wall of the tapered surface 16 contracts radially along its length until, upon the metal reaching ambient temperature (see FIGURE 3), the surface 16 throughout its length is in compressive engagement against the lateral surface portion of the tapered end 12 of the rod.

Thus, it will be seen that the support element 14 functions as a spring element to continuously press inward on a substantial surface area of the laser rod, but without exerting damaging compressive force at the corner or periphery of the end face of the rod. To further aid in this connection, the gripping end of the support element is made comparatively thin. For example, as indicated at 18, the lateral surface of the support element, over a distance substantially greater than the axial length of the surface 16, is milled down so the wall thickness of the end that first engages the rod in assembly is extremely thin, e.g., 0.010"–0.020" thick. Such construction imparts a definite spring quality to the rod engaging portion of the support element. Also, this insures that the wall thickness at the inner end of the tapered surface 16 is sufficiently thin that when it contracts against the periphery of the end face of the tapered end 12 of the rod, the compressive forces created cannot fracture the rod.

Thus, in sharp contrast to prior art techniques wherein considerable pressure is applied to the corner or peripheral portion of the end face of the rod, my invention avoids the possibility of frequent fractures of laser rods caused by such application of end forces.

In addition, the compressive force exerted by the spring action of the support element 14 is sufficient to insure the desired hermetic seal between the contacting surface areas of the tapered end 12 and surface 16. I thus assure against any leakage of fluid between these contacting surface areas into the interior of the support element 14.

In addition to the foregoing, my invention has the advantage that it facilitates assembly of a laser rod in its support elements. By forming the rod 10 with substantially identically tapered ends, and substantially identical support elements 14, it does not matter which end of the laser rod is inserted into which support element. In assembling the support elements on the rod—which can be done in any suitable manner, as by chucking up the elements in a machine having accurately aligned chucks—the assembly proceeds without regard as to which end of the laser rod is that through which the beam emerges. Thereafter, the rod with its supporting elements 14 thereon may be inserted in a laser support housing in the proper position to cause the beam to emerge from the housing in the desired direction.

From the foregoing, it will be apparent that various modifications can be made in the particular rod and support element constructions illustrated herein without departing from the spirit and scope of my invention. Accordingly, I do not intend that my invention be limited, except as by the appended claims.

I claim:
1. In combination:
a laser rod having a tapered end;
a tubular support element of spring material, said support element having an end portion encircling the tapered end of the rod and having an interior tapered surface in face to face contact with the lateral surface of said tapered end and forming a fluid-tight seal thereon.

2. The combination of claim 1, wherein the support element is adapted to be heated and expanded preparatory to its being placed on the tapered end of the rod, the degree of taper of said interior tapered surface when said element is heated being less than that of the tapered end of the rod.

3. The combination of claim 2, wherein the diameter of the outer end of said interior tapered surface, when the support element is heated, is substantially the same as that of the untapered portion of the rod.

4. The combination of claim 3, wherein the degree of taper of the tapered end of the rod is not greater than six degrees, and the degree of taper of said interior tapered surface is a predetermined number of minutes of a degree less than that of the tapered end of the rod.

5. The combination of claim 1, wherein the other end of the rod is tapered substantially the same as the first-mentioned tapered end thereof, and including a second tubular support element of spring material having a portion encircling said other tapered end of the rod and having an interior tapered surface in face to face contact with the lateral surface of said other tapered end and forming a fluid-tight seal thereon.

6. The combination of claim 5, wherein both support elements are substantially identical in size, thereby to permit assembly of either support element on either of the tapered ends of the rod.

References Cited by the Examiner
UNITED STATES PATENTS

| | | | |
|---|---|---|---|
| 2,291,177 | 7/1942 | Vanderveld | 248—264 |
| 2,464,908 | 3/1949 | Volkmann | 287—126 X |
| 2,498,590 | 2/1950 | Straus | 287—126 X |
| 2,810,598 | 10/1957 | Lief | 287—119 |
| 2,973,870 | 3/1961 | Schoos | 211—123 |

CLAUDE A. LE ROY, *Primary Examiner.*